Patented Sept. 7, 1937

2,092,517

UNITED STATES PATENT OFFICE 2,092,517

CONDENSATION PRODUCTS OF THE AZABENZANTHRONE SERIES

Max Albert Kunz, Mannheim, and Gerd Kochendoerfer and Karl Koeberle, Ludwigshafen-on-the-Rhine, Germany, assignors to General Aniline Works, Inc., New York, N. Y., a corporation of Delaware No Drawing. Application March 30, 1933, Serial No. 663,649. In Germany October 26, 1932

11 Claims. (Cl. 260—40)

The present invention relates to new valuable condensation products of the azabenzanthrone series and a process of making same.

A copending application Ser. No. 663,645 filed March 30, 1933, by Kunz and Kochendoerfer describes a process for the manufacture and production of nitrogenous condensation products of the azabenzanthrone series according to which pyridinonaphthalenes, which contain in the isocyclic rings at least one oxygen atom in phenolic or ketonic combination, are caused to react in an acid medium with acrolein or its homologues or substitution products or other compounds capable of reacting like acrolein.

We have now found that valuable nitrogenous condensation products are obtained by treating compounds of the azabenzanthrone series, namely azabenzanthrones or homologues or derivatives thereof which contain in the peri-positions only substituents which are readily split off, such as hydrogen, halogen, amino, hydroxy, mercapto or nitro groups, with alkaline condensing agents, and if desired allowing halogenating, sulphonating or nitrating agents to act on the resulting reaction products. By this treatment it is probable that new compounds are formed from two molecules of azabenzanthrone by union in one or in both peri-positions, the new compounds in the latter case being probably of the perylene series. Suitable alkaline condensing agents are for example caustic potash, caustic soda, alcoholic potash or soda, sodamide, sodium aniline or mixtures thereof.

The treatment of the azabenzanthrones with the alkaline condensing agents is usually carried out at elevated temperature, as for example while fusing the alkaline condensing agent or in the presence of diluents. It is frequently of advantage to add substances which lower the melting point to the alkaline condensing agents, as for example alkali metal salts of fatty acids, such as acetates, propionates, butyrates or mixtures of these salts.

The resulting condensation products may be halogenated in the usual manner by treatment with halogen or agents supplying halogen in the presence or absence of diluents and/or of catalysts. They may also be nitrated, as for example with nitric acid of high percentage strength or with nitric acid diluted with organic or inorganic solvents or with salts of nitric acid in acid solution. The negatively substituted products may then be condensed with amino compounds such as aminoanthraquinones, hydroxy compounds or their salts, or mercapto compounds or their salts. The said condensation is preferably effected in organic solvents or diluents, such as nitrobenzene, naphthalene, halogen benzene, diphenyl, diphenylether and quinoline. Acid-binding agents and catalysts are used with advantage; suitable acid binding agents are for example alkali and alkaline earth metal carbonates, acetates and further salts of the said metals and earth alkali metal oxides; suitable catalysts are for example copper and its compounds. The products of this condensation are generally obtained in good yields. They are usually vat dyestuffs of good fastness; they may be used also as intermediate products in the production of dyestuffs.

The condensation products are usually obtained in very good yields and may, if necessary, be purified by the usual methods, as for example by vatting, by way of their salts or by treatment with oxidizing agents.

The following examples will further illustrate the nature of this invention but the invention is not restricted to these examples. The parts are by weight.

Example 1

50 parts of 8-azabenzanthrone (obtainable according to Example 1 of the said application Ser. No. 663,645 filed on March 30, 1933, by Kunz and Kochendoerfer) are introduced into a mixture of 50 parts of caustic potash and 30 parts of ethyl alcohol at 90° C. and the whole kept at the said temperature until a sample of the isolated condensation product melts at about 320° C. The reaction mixture is then poured into water, boiled after an addition of about 20 parts of hydrochloric acid and filtered by suction while hot. The residue is boiled with 50 parts of ethyl alcohol and then crystallized from trichlorbenzene with an addition of animal charcoal. An orange-brown crystal powder is obtained which melts above 320° C. and which cannot be vatted. Analysis yields values which correspond with a diazadibenzanthronyl. The product has the following constitution:

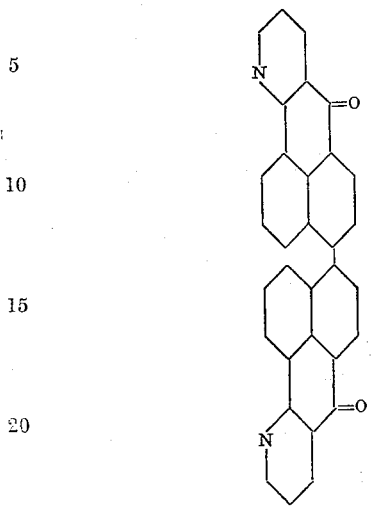

In a similar manner isomeric azabenzanthrones as well as derivatives of azabenzanthrones, as for example halogen and alkyl derivatives, may be converted into compounds which are homologues to the diazadibenzanthronyl.

Example 2

A mixture of 200 parts of caustic potash, 160 parts of ethyl alcohol and 25 parts of 8-azabenzanthrone are heated to from 150° to 155° C. while distilling off the ethyl alcohol and kept at about the same temperature until no further increase in the amount of dyestuff can be observed. The melt is cooled somewhat, stirred into water, a part of the alkali neutralized with hydrochloric acid, the whole heated at from 50° to 60° C. after adding a little hydrosulphite and filtered by suction. The reaction product is precipitated from the filtrate by blowing with air. It dissolves in concentrated sulphuric acid giving a green coloration and dyes cotton powerful reddish violet shades from a violet-blue vat. If necessary the dyestuff, which according to analysis is a diazadibenzanthrone, may be purified in the usual manner by vatting, by way of its salts or by crystallization.

Example 3

A mixture of 163 parts of 8-azabenzanthrone sulphonic acid (obtainable according to Example 4 of the copending application Ser. No. 663,647, filed March 30, 1933, by Kunz, Kochendoerfer and Koeberle), 1100 parts of caustic potash and 800 parts of ethyl alcohol are heated at 150° C. while stirring vigorously and while distilling off the ethyl alcohol until no further increase in the amount of dyestuff can be observed. The melt is then worked up as described in Example 2 and a product is obtained which, similarly to the condensation product obtained according to Example 2, yields a violet-blue vat, dissolves in concentrated sulphuric acid giving a green coloration, but dyes cotton considerably bluer shades which are insensitive to acids and alkalies. The reaction product may be crystallized from boiling quinoline. It is a diazadibenzanthrone.

The condensation product obtained from Bz1-8-azabenzanthrone mercaptan and caustic potash dissolves in concentrated sulphuric acid giving a green-blue coloration, yields a wine red vat and dyes dark blue shades.

Example 4

10 parts of Bz2-amino-8-azabenzanthrone are introduced into a melt of 200 parts of caustic potash and 160 parts of ethyl alcohol at 130° C., the whole being kept at 145° C. after all has been introduced until there is no further increase in the amount of dyestuff. The hot melt is then taken up with water and the dyestuff which is present in the form of its leuco compound is precipitated by blowing with air, filtered by suction and washed. The reaction product which is a Bz2.Bz2'-diamino-diazadibenzanthrone yields a blue vat from which the vegetable fibre is dyed dark green shades.

Example 5

20 parts of the condensation product obtainable according to Example 2 are introduced at a temperature below 5° C. into a mixture of 240 parts of nitrobenzene and 30 parts of concentrated nitric acid. The temperature is then allowed to rise slowly to 30° C. and kept at this value until a sample withdrawn and worked up yields a reddish blue vat. The whole is then filtered, excess of soda is added to the filtrate and the nitrobenzene is expelled by steam distillation. The residue is a nitro derivative of the initial material which dissolved in concentrated sulphuric acid giving a green coloration and dyes cotton grey-blue shades from a reddish blue vat.

Example 6

50 parts of the condensation product obtainable according to Example 2 are heated at from 70° to 80° C. in 500 parts of 65 per cent nitric acid while stirring until a sample withdrawn yields a pure blue vat from which cotton is dyed green shades. The whole is then allowed to cool, poured into water, filtered by suction, washed until neutral and dried. The reaction product thus obtained is probably a dinitro-diazadibenzanthrone; it dissolves in concentrated sulphuric acid giving a green coloration and yields from a blue vat green dyeings of good fastness which change to grey or black by treatment with chlorine.

Example 7

50 parts of the condensation product obtainable according to Example 2 are heated at from 130° to 140° C. in 1000 parts of nitrobenzene while leading in chlorine gas until chlorine is no longer absorbed. The whole is then allowed to cool and the reaction product is isolated by filtering by suction or expelling the solvent with steam or distilling under reduced pressure. The tetrachlordiazadibenzanthrone obtained dissolves in concentrated sulphuric acid giving a green coloration and yields a green-blue vat from which vegetable fibres are dyed violet-blue shades of very good fastness.

The chlorination may also be carried out with sulphuryl chloride in the presence of iodine and nitrobenzene.

By treating the initial material employed in the first paragraph of this example with bromine in nitrobenzene in the presence of iodine and iron, a dibromdiazadibenzanthrone is obtained which yields clear violet dyeings from a blue-violet vat and which dissolves in concentrated sulphuric acid giving a yellow-green coloration.

Example 8

46 parts of the condensation product obtainable according to Example 2 are dissolved in 500 parts of chlorsulphonic acid and, after the addition of 100 parts of bromine and 5 parts of sulphur, heated at from 70° to 80° C. until the greater part of the bromine has been absorbed. The whole is then allowed to cool, the melt poured into ice-cold water, filtered by suction and washed until neutral. The dichlordibromdiazadibenzanthrone obtained yields blue-violet dyeings on vegetable fibres from a violet-blue vat and dissolves in concentrated sulphuric acid giving a green coloration.

Antimony may be employed as the halogen transferrer instead of sulphur. The bromination may also be carried out in oleum, concentrated sulphuric acid, or a mixture of chlorsulphonic acid and oleum. By treating the nitro derivative obtainable according to Example 5 with bromine in the presence of chlorsulphonic acid, a bromonitro derivative is obtained.

The initial material employed in paragraph 1 of this example may also be brominated in aqueous suspension or by grinding with free bromine and in the absence of a halogen transferrer.

*Example 9*

A mixture of 20 parts of caustic potash, 16 parts of alcohol and 3 parts of 7-hydroxy-8-azabenzanthrone is stirred and heated up to 200° C. whereby the alcohol is distilled off. This temperature is maintained for between 1 and 2 hours. Then the melt is poured into water and filtered after the addition of some sodium hydrosulphite. By leading in air the reaction product is precipitated as a bluish black powder dissolving in sulphuric acid giving a green blue coloration and dyeing wool blue shades from a violet red vat. It is a 7.7'-dihydroxy-diazadibenzanthrone.

In the appended claims the term "end nuclei" is to be understood as designating the nuclei at the ends of the di-azabenzanthrone formula, that is, the nuclei which contain a nitrogen atom in the formula given in Example 1.

What we claim:—

1. A diazadibenzanthrone wherein each of the two end nuclei contains one ring nitrogen atom.

2. Diazadibenzanthrones of the group consisting of unsubstituted diazadibenzanthrones wherein each of the two end nuclei contains one ring nitrogen atom and halogen-, nitro-, amino- and hydroxy-derivatives thereof.

3. Diazadibenzanthrones as claimed in claim 2 wherein the substituted compounds contain up to two substituents.

4. A halogenated diazadibenzanthrone wherein each of the two end nuclei contains one nitrogen atom.

5. A nitro diazadibenzanthrone wherein each of the two end nuclei contains one nitrogen atom.

6. A hydroxy diazadibenzanthrone wherein each of the two end nuclei contains one nitrogen atom.

7. A dihydroxy diazadibenzanthrone wherein each of the two end nuclei contains one nitrogen atom.

8. A diazadibenzanthrone containing up to four halogen atoms wherein each of the two end nuclei contains one nitrogen atom.

9. A 7.7'-dihydroxy diazadibenzanthrone wherein each of the two end nuclei contains one nitrogen atom.

10. A tetrachlor diazadibenzanthrone wherein each of the two end nuclei contains one nitrogen atom.

11. A dinitro diazadibenzanthrone wherein each of the two end nuclei contains one nitrogen atom.

MAX ALBERT KUNZ.
GERD KOCHENDOERFER.
KARL KOEBERLE.